United States Patent Office 3,200,147
Patented Aug. 10, 1965

3,200,147
POLYMERIC ORGANOBORON COMPOUNDS AND METHOD OF MAKING SAME
Robert J. Brotherton, Fullerton, Lowell L. Petterson, Whittier, and Allen L. McCloskey, Orange, Calif., assignors to United States Borax & Chemical Corporation, Los Angeles, Calif., a corporation of Nevada
No Drawing. Filed Mar. 22, 1962, Ser. No. 181,790
6 Claims. (Cl. 260—551)

The present invention relates as indicated to a new class of polymeric organoboron compounds, and has further reference to means for preparing these polymeric compounds.

It is, therefore, the principal object of the present invention to provide a new class of thermally stable polymeric organoboron compounds.

It is a further object of this invention to provide an efficient means for preparing these new thermally stable polymeric compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises polymeric organoboron compounds having the recurring structural unit

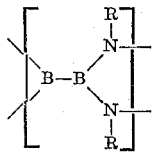

where R is selected from the group consisting of primary and secondary alkyl radicals of from 1 to 6 carbon atoms.

The polymeric organoboron compounds of the present invention are either solids or liquids, and are thermally stable at temperatures up to about 400° C. The polymeric liquids are viscous, high-boiling compounds which have utility as lubricants and heat transfer media, while the polymeric solids find utility as molding and casting resins. The solid polymeric compounds will also be found to have utility as protective coatings for various materials, such as, for example, different types of cloth and wire, which are to be subjected to high temperature environments.

The present polymeric organoboron compounds are prepared by the thermal elimination of amines from tetra-(alkylamino)diboron compounds derived from primary amines. This reaction can best be illustrated by the following equation:

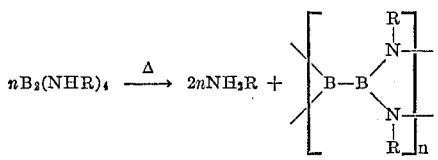

where R is either a primary or secondary alkyl radical of from 1 to 6 carbon atoms, and $n$ is an integer greater than 1.

It is of utmost importance to note that the tetra(alkylamino)diboron compounds applicable as starting materials in the preparation of the present polymeric compounds are derived from primary amines. These compounds, having the formula $$B_2(NHR)_4$$

where R is either a primary or secondary alkyl radical, are prepared by the transamination of a tetra(dialkylamino)diboron compound with a primary aliphatic amine. The tetra(dialkylamino)diboron compounds are known in the art, and reference to methods for preparing them can be found in the Brotherton et al. patent, U.S. No. 2,974,165.

The following list is illustrative of the tetra(alkylamino)diboron compounds applicable to the present invention:

Tetra(methylamino)diboron
Tetra(ethylamino)diboron
Tetra(n-propylamino)diboron
Tetra(isopropylamino)diboron
Tetra(n-butylamino)diboron
Tetra(sec-butylamino)diboron
Tetra(n-amylamino)diboron
Tetra(isoamylamino)diboron
Tetra(2-sec-amylamino)diboron
Tetra(n-hexylamino)diboron It is to be clearly understood that the foregoing list of compounds is only a partial enumeration of the tetra-(alkylamino)diborons applicable to the present invention, and is not intended to limit the invention.

The preferred method for performing the present polymerization reactions is to slowly heat the applicable tetra(alkylamino)diboron compounds under vaccum or under a slow stream of an inert gas, such as nitrogen or helium, to continuously remove the amine evolved. The tetra-(alkylamino)diborons begin to elminate amine at temperatures of from about 25° C. to about 100° C.; however, as the amine is evolved it is necessary to slowly increase the temperature from about 150° C. to about 375° C. to drive the reaction to completion. After the amine evolution is completed, the reaction mass is allowed to cool and the desired polymeric compound is recovered as the residue.

So that the present invention can be more clearly understood, the following examples are given for illustrative purposes:

I. Tetra(methylamino)diboron, 1.608 grams (11.3 mmoles), was placed in a flask at reduced temperature. The flask was equipped with a nitrogen inlet and a gas outlet which was attached to a cold trap maintained at −145° C. to collect the volatile reaction products. A slow stream of dry nitrogen was passed through the flask which was then slowly heated to about 80° C. for about 6.5 hours. The temperature was then slowly raised to about 155° C. and kept there for about 36 hours at which time amine evolution had stopped. Analysis of the volatile reaction product showed it to be methylamine. The flask was then allowed to cool to ambient temperature and the resultant product had a molecular weight of 217, determined cryoscopically, in benzene. The product when heated to 420° C. showed no visible degradation, but did show an increase in molecular weight due to crosslinking caused by the heating. Chemical analysis of the product yielded the following data.

Calculated for $C_2H_6B_2N_2$: B=27.14%, C=30.2%. Found in product: B=27.96%, C=31.2%.

II. Tetra(n-hexylamino)diboron, 5.473 grams (24.9 mmoles), was placed in a flask which was connected to a vacuum line. The effluent products were passed through a cold trap kept at −85° C. to collect the volatile reaction products. The system was evacuated and the flask was heated to from about 25° C. to about 50° C. for about 18 hours. Amine evolution was slow and the temperature was increased in increments over about an 80-hour period to about 365° C. where the amine evolution was complete. Analysis of the volatile reaction product showed it to be n-hexylamine. The flask was then allowed to cool, and a viscous liquid resulted which had a molecular weight of 1750, determined cryoscopically, in benzene. Chemical analysis of the product yielded the following data.

Calculated for $C_{12}H_{26}B_2N_2$: B=9.84%, N=12.7%, H=12.1%. Found in product: B=10.10%, N=13.0%, H=11.9%.

Other modes of applying the principle of the invention may be employed, change being made as regards the details described, provided the features stated in any of the following claims or the equivalent of such be employed.

We, therefore, particularly point out and distinctly claim as our invention:

1. Polymeric organoboron compounds consisting essentially of the recurring structural unit

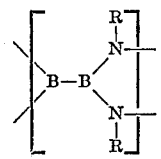

where R is selected from the group consisting of primary and secondary alkyl radicals of from 1 to 6 carbon atoms, said compounds being viscous liquid polymers and being thermally stable at temperatures up to about 400° C.

2. A polymeric organoboron compound consisting essentially of the recurring structural unit

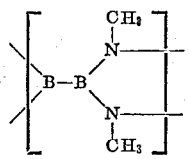

said compound being a viscous liquid polymer and being thermally stable at temperatures up to about 400° C.

3. A polymeric organoboron compound consisting essentially of the recurring structural unit.

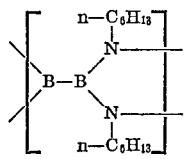

said compound being a viscous liquid polymer and being thermally stable at temperatures up to about 400° C.

4. The method for preparing polymeric organoboron compounds consisting essentially of the recurring structural unit

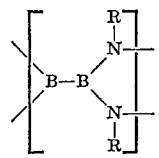

which comprises slowly heating a tetra(alkylamino) diboron compound, having the formula $B_2(NHR)_4$, to a temperature of from about 150° C. to about 375° C., continuously removing the volatile reaction product, allowing the reaction mass to cool and recovering said polymeric organoboron compound, where R is selected from the group consisting of primary and secondary alkyl radicals of from 1 to 6 carbon atoms, said compounds being viscous liquid polymers and being thermally stable at temperatures up to about 400° C.

5. The method for preparing a polymetric organoboron compound consisting essentially of the recurring structural unit

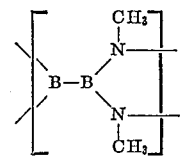

which comprises slowly heating tetra(n-hexylamino) diboron to a temperature of from about 150° C. to about 375° C., continuously removing the volatile reaction products, allowing the reaction mass to cool and recovering said polymeric organoboron compound, said compound being a viscous liquid polymer and being thermally stable at temperatures up to about 400° C.

6. The method for preparing a polymeric organoboron compound consisting essentially of the recurring structural unit

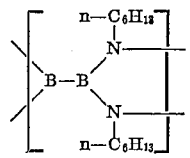

which comprises slowly heating tetra(n-hexylamino) diboron to a temperature of from about 150° C. to about 375° C., continuously removing the volatile reaction products, allowing the reaction mass to cool and recovering said polymeric organoboron compounds, said compound being a viscous liquid polymer and being thermally stable at temperatures up to about 400° C.

References Cited by the Examiner

Marvel et al.: Wright Air Development Division Technical Report, 61–12, April 1961, pages 103–104.

WILLIAM H. SHORT, *Primary Examiner.*

J. R. LIBERMAN, *Examiner.*

UNITED STATES PATENT OFFICE
CERTIFICATE OF CORRECTION

Patent No. 3,200,147                                                     August 10, 1965

Robert J. Brotherton et al.

It is hereby certified that error appears in the above numbered patent requiring correction and that the said Letters Patent should read as corrected below.

Column 2, line 32, for "vaccum" read -- vacuum --; column 4, line 29, for "tetra(n-hexylamino)" read -- tetra(methylamino) --.

Signed and sealed this 15th day of February 1966.

(SEAL)
Attest:

ERNEST W. SWIDER                                        EDWARD J. BRENNER
Attesting Officer                                            Commissioner of Patents